(12) United States Patent
Hallar et al.

(10) Patent No.: US 6,761,477 B2
(45) Date of Patent: Jul. 13, 2004

(54) MIXER ASSEMBLY WITH LOCKING PIVOT HEAD

(75) Inventors: James Hallar, Richmond, VA (US); Martin Brady, Richmond, VA (US)

(73) Assignee: Hamilton Beach/Proctor-Silex, Inc., Glen Allen, VA (US)

(*) Notice: Subject to any disclaimer, the term of this patent is extended or adjusted under 35 U.S.C. 154(b) by 72 days.

(21) Appl. No.: 10/185,054

(22) Filed: Jun. 28, 2002

(65) Prior Publication Data

US 2004/0001387 A1 Jan. 1, 2004

(51) Int. Cl.[7] .............................................. B01F 13/00

(52) U.S. Cl. ..................... 366/207; 366/331; 366/199

(58) Field of Search ............................... 366/331, 199, 366/197, 207; D7/412, 379; 248/664, 127, 133, 139, 142; 403/164

(56) References Cited

U.S. PATENT DOCUMENTS

| | | | |
|---|---|---|---|
| 1,862,181 A | * | 6/1932 | Emmons, III ............... 366/197 |
| 1,902,678 A | * | 3/1933 | Theodoropulos ............ 366/197 |
| 2,001,036 A | * | 5/1935 | Prince ........................ 366/207 |
| 2,013,887 A | | 6/1935 | Jeppsson |
| 2,046,784 A | | 7/1936 | Krause |
| 2,103,928 A | * | 12/1937 | Bean .......................... 366/199 |
| 2,202,724 A | * | 5/1940 | Bean .......................... 248/664 |
| 2,275,901 A | * | 3/1942 | Harwood .................... 366/199 |
| 2,330,860 A | * | 10/1943 | Behar ......................... 366/199 |
| 2,529,120 A | * | 11/1950 | Wallach et al. ............. 366/331 |
| 2,599,275 A | * | 6/1952 | Nelson ........................ 366/199 |
| 2,789,798 A | * | 4/1957 | Brace ......................... 366/199 |
| 2,847,199 A | * | 8/1958 | Gasparotti .................. 366/199 |
| 3,312,433 A | * | 4/1967 | Peterson ..................... D7/379 |
| 3,904,178 A | | 9/1975 | Scott et al. |
| 4,026,532 A | | 5/1977 | Madan |
| 4,070,711 A | * | 1/1978 | Smader ....................... D7/379 |
| 4,277,181 A | * | 7/1981 | Stahly et al. ............... 366/300 |
| 4,325,643 A | | 4/1982 | Scott et al. |
| 4,504,152 A | | 3/1985 | Moller et al. |
| D279,858 S | | 7/1985 | Janssens |
| 4,645,352 A | | 2/1987 | Valbona et al. |
| 4,927,120 A | * | 5/1990 | Wang ......................... 248/127 |
| 5,000,578 A | | 3/1991 | Artin et al. |
| 5,028,141 A | | 7/1991 | Stiegelmann |
| 5,106,346 A | | 4/1992 | Locher et al. |
| 5,524,530 A | | 6/1996 | Nijzingh et al. |
| D384,549 S | | 10/1997 | Cesaroni et al. |
| D387,244 S | | 12/1997 | Ivy et al |
| D387,245 S | | 12/1997 | Hippen et al. |
| D387,610 S | | 12/1997 | Hippen et al. |
| D395,572 S | | 6/1998 | Carroll et al. |
| 5,782,558 A | * | 7/1998 | Roberts ...................... 366/199 |
| D400,759 S | | 11/1998 | Doggett |
| 5,908,242 A | | 6/1999 | St. John et al. |
| 5,911,505 A | | 6/1999 | St. John et al. |
| 5,957,578 A | * | 9/1999 | Holbrook et al. ........... 366/197 |
| D416,752 S | | 11/1999 | Leverrier |
| D436,497 S | | 1/2001 | Nalbandian |
| 6,312,150 B1 | | 11/2001 | Allard et al. |
| 6,588,930 B2 | * | 7/2003 | Wilson ....................... 366/199 |

OTHER PUBLICATIONS

Stand Mixer Manual, Hamilton Beach, Proctor–Silex, Inc., 840086200 Apr. 2001, 10 pages.

* cited by examiner

*Primary Examiner*—Tony G. Soohoo
(74) *Attorney, Agent, or Firm*—Akin Gump Strauss Hauer & Feld, LLP

(57) ABSTRACT

A mixer stand for supporting a mixer includes a base member, a turntable mounted for rotation on the base member, a bowl supported on the turntable, a pedestal extending generally upwardly from the base member, and a pivot head pivotally connected to an upper portion of the pedestal for receiving the mixer. A first locking mechanism is operably associated with the pivot head and the pedestal for locking the pivot head in an upright operative position and/or a tilted position. A second locking mechanism is operably associated with the pivot head and the mixer for releasably locking the mixer onto the pivot head.

41 Claims, 17 Drawing Sheets

MIXER ASSEMBLY WITH LOCKING PIVOT HEAD

BACKGROUND OF THE INVENTION

This invention relates to food mixers, and more particularly to food mixers with locking pivot heads.

To assist in the commercial and domestic preparation of food requiring mixing and/or kneading, hand-held mixers and stand mixers have often been employed. Stand mixers typically include a base or stand on which a rotatable turntable rests for holding mixing bowls of various sizes, a mixer head including an electric motor, and a suitable gear assembly for driving one or more mixing implements, such as beaters, dough hooks, and the like.

It is often desirable to lock the mixer head in an upright operative position to prevent bouncing of the mixer head in heavy dough. It is also desirable to lock the mixer head in a tilted position to prevent the mixer head from falling back to the upright position during procedures such as scraping the contents of the mixing bowl, adding ingredients, removing or installing the mixing bowl and/or implements associated with the mixer head, and so on. Furthermore, it may be desirable to removably mount a hand-held mixer on a mixer stand so that the hand-held mixer can be used as a stand mixer.

BRIEF SUMMARY OF THE INVENTION

In accordance with one aspect of the invention, a mixer stand for an electric mixer comprises a pedestal, a pivot head connected to the pedestal for pivotal movement between an upright position for operating the electric mixer and a tilt position, and a locking mechanism for releasably locking the pivot head with respect to the pedestal in at least one of the upright and tilt positions. The locking mechanism has a first locking member operatively connected to the pedestal and a second locking member operatively connected to the pivot head. One of the first and second locking members is biased toward a lower locking position with the first and second locking members being mutually engaged to prevent pivotal movement of the pivot head with respect to the pedestal. The one locking member is movable toward an upper release position where the first and second locking members are disengaged to permit pivotal movement of the pivot head with respect to the pedestal. An electric mixer can be pivotally attached to the pivot head or the pivot head may be integrally formed with the electric mixer housing.

In accordance with a further aspect of the invention, a mixer assembly comprises a hand mixer, a mixer stand for supporting the hand mixer, and a locking mechanism for releasably locking the hand mixer onto the mixer stand. The mixer stand has a base member, a turntable mounted for rotation on the base member, a bowl supported on the turntable, a pedestal extending generally upwardly from the base member, and a cradle connected to an upper portion of the pedestal for receiving the hand mixer. The locking mechanism includes a latch member positioned on one of the cradle and the hand mixer and a first depression located on the other of the cradle and the hand mixer. The latch member is releasably engaged with the depression to thereby releasably connect the hand mixer to the cradle.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

The invention will now be described in greater detail with reference to the drawings, wherein like parts throughout the drawing figures are represented by like numerals.

DETAILED DESCRIPTION OF THE INVENTION

Figure 1:
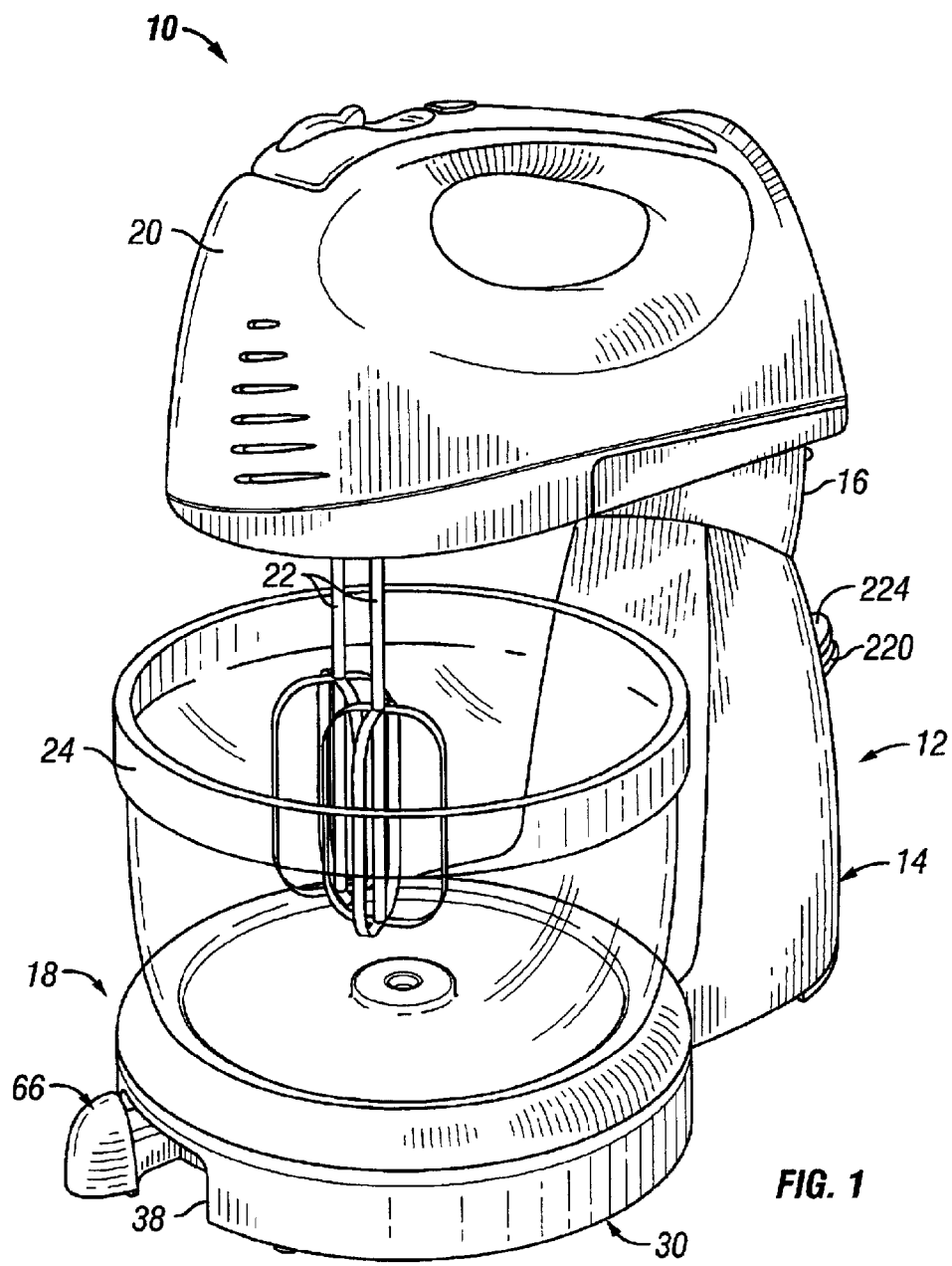
FIG. 1 is a perspective view of a food mixer assembly according to one embodiment of the present invention.
Figure 2:
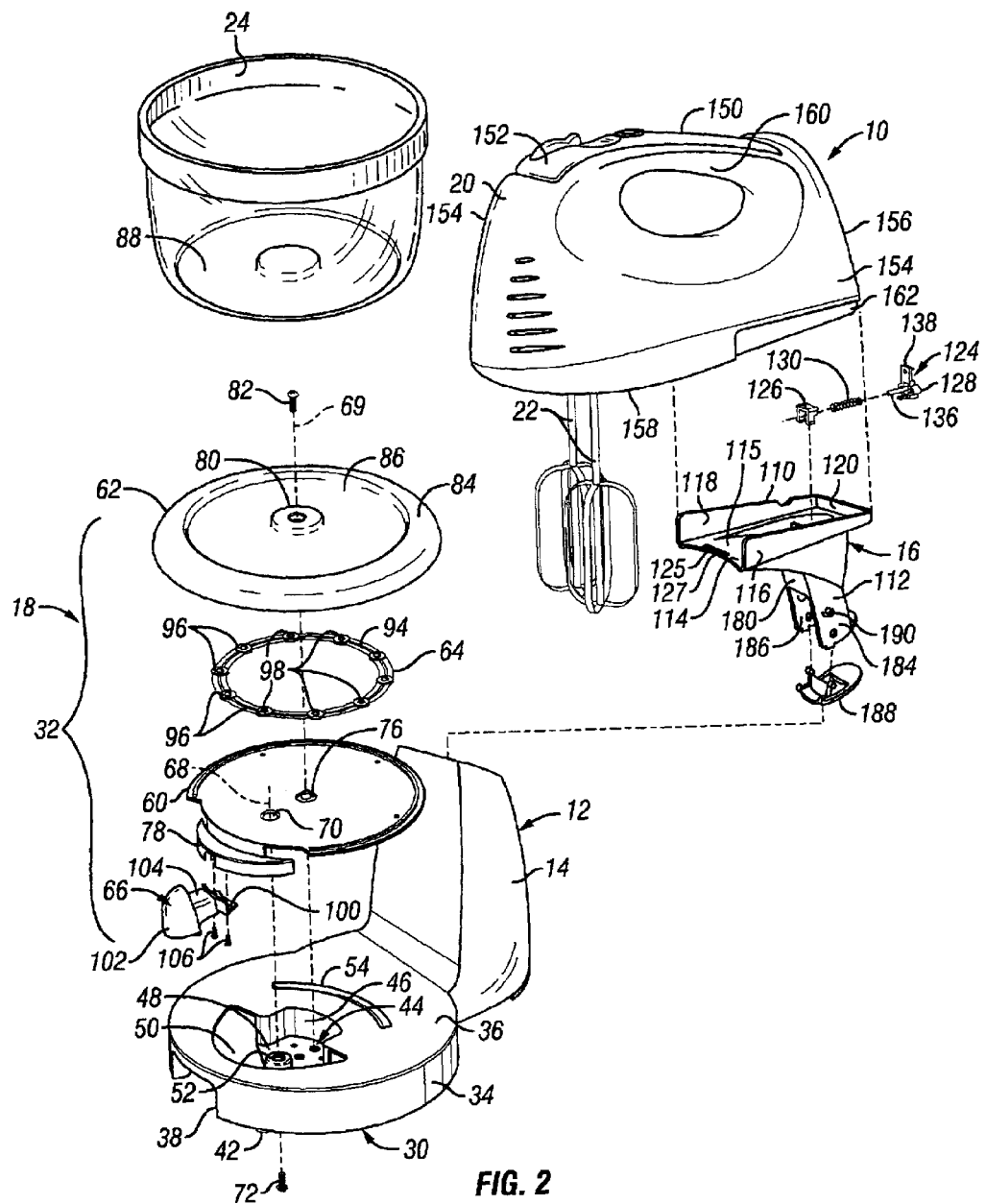
FIG. 2 is an exploded perspective view of the mixer assembly of FIG. 1.
Figure 6:
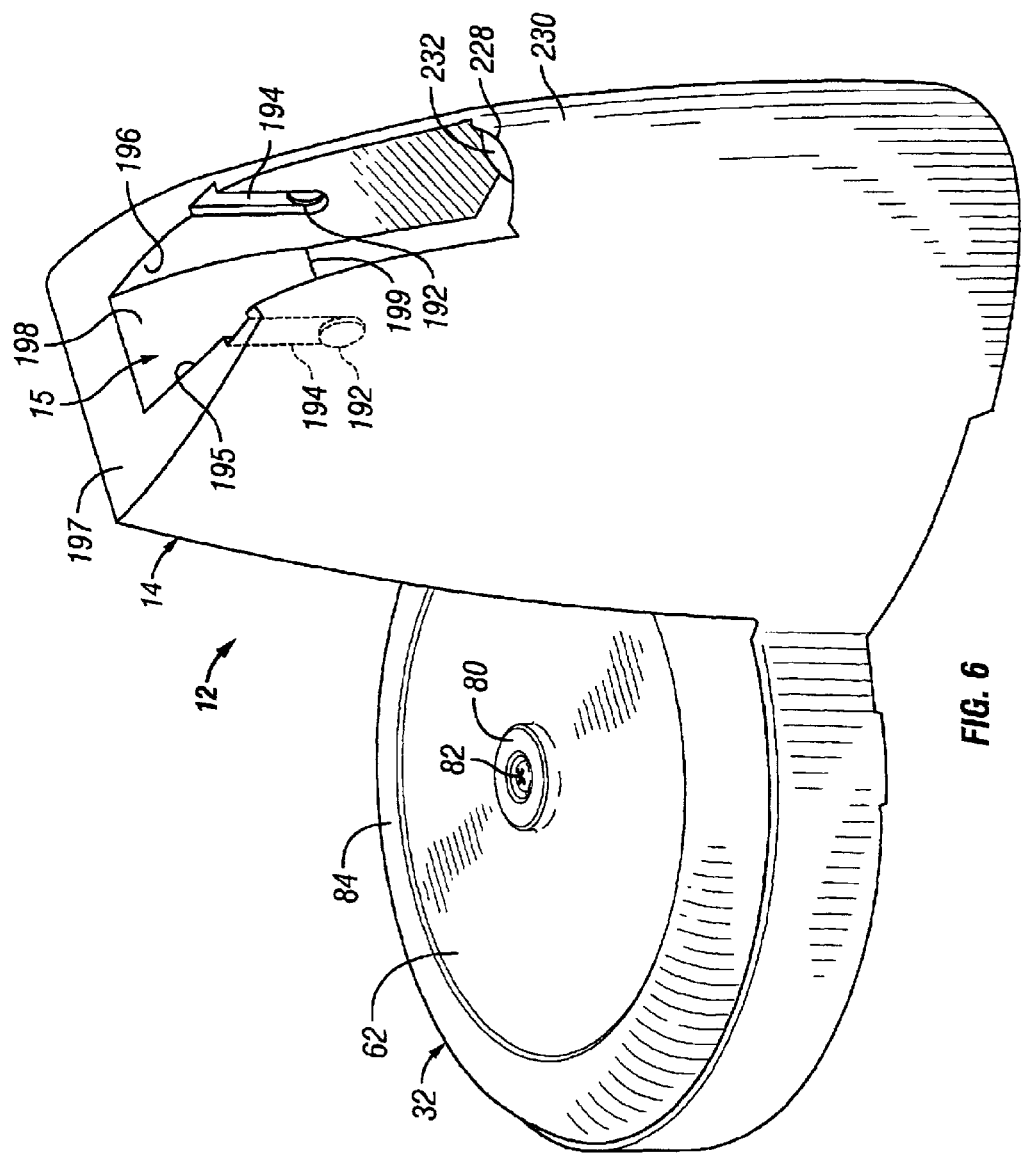
FIG. 6 a rear perspective view of the mixer stand without the pivot head.

Referring now to the drawings, and to FIGS. 1 and 2 in particular, a mixer assembly 10 includes a mixer stand 12, a hand mixer 20 removably connectable to the mixer stand 12, and a mixing bowl 24 supported on the mixer stand. The mixer stand 12 has a pedestal 14 with a channel 15 (FIG. 6), a pivot head 16 pivotally connected to the pedestal 14 within the channel 15, and a platform portion 18 extending from the pedestal 14. The hand mixer 20 is removably mounted on the pivot head 16, and the mixing bowl 24 is removably supported on the platform portion 18. Mixing implements 22, shown here as beaters, may be attached to the hand mixer 20 in a well-known manner for manipulating any contents (not shown) within the mixing bowl 24.

Figure 3:
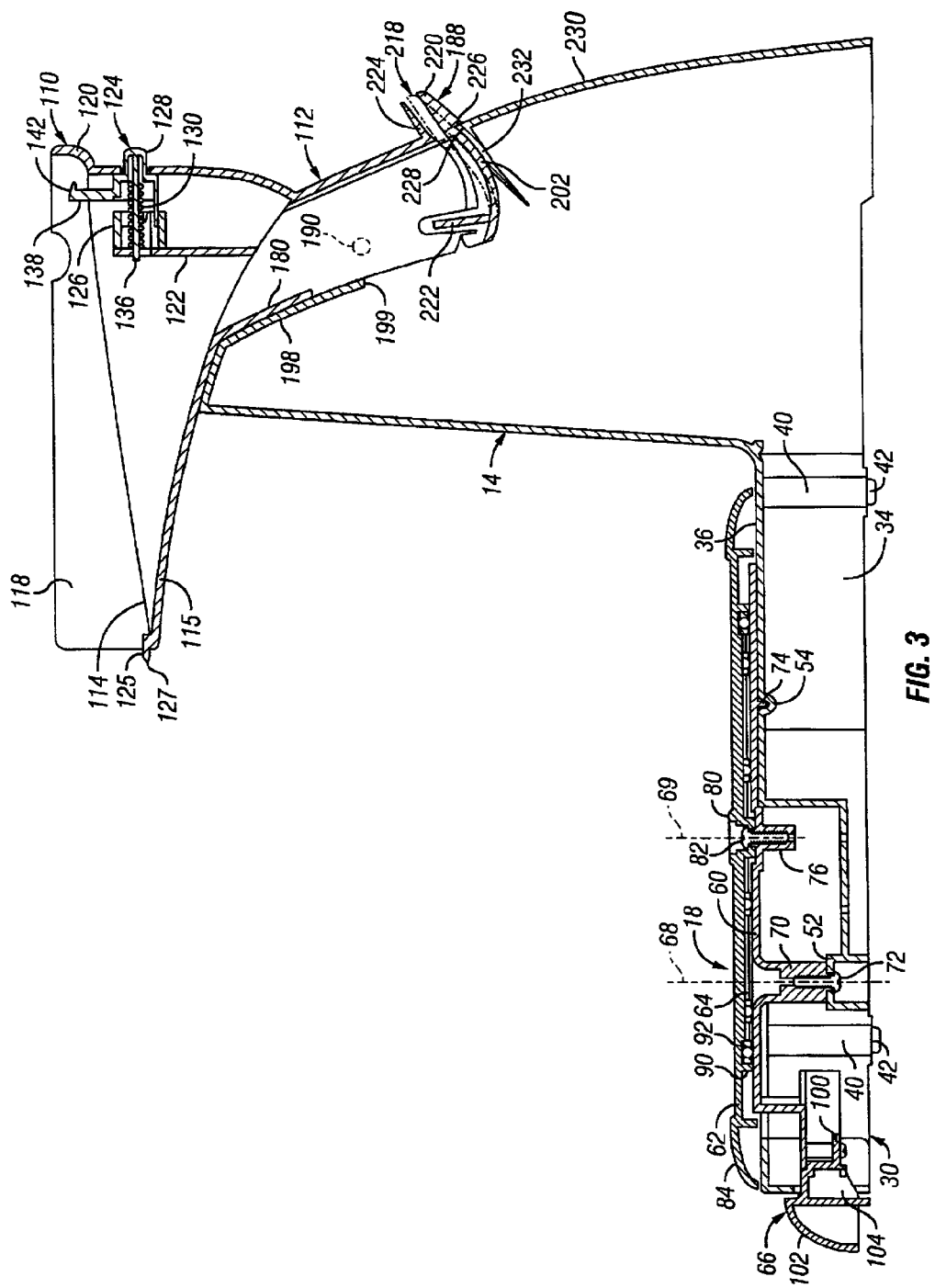
FIG. 3 is a longitudinal sectional view of a mixer stand that forms part of the mixer assembly of the present invention.

With further reference to FIG. 3, the platform portion 18 of the mixer stand 12 has a support base 30 that is preferably integrally formed with the pedestal 14 and a turntable assembly 32 (FIG. 2) that is connected to the support base for both rotational and reciprocal movement, as will be described in greater detail below.

The support base 30 has an upright wall 34 that is arcuate in shape and an upper wall 36 that is preferably integrally formed with the upright wall 34. An elongate opening 38 is formed in a forward portion of the upright wall 34. Pairs of spaced support legs 40 are preferably integrally formed with the upright wall 34 on either side of the elongate opening 38. A pad 42, preferably constructed of a soft elastomer or felt material, is connected to a lower end of each support leg for damping vibration and preventing sliding movement of the mixer assembly 10 on a support surface (not shown) during operation. A depression 44 is formed in the upper wall 36 and includes an inner upright surface 46 that extends downwardly from the upper wall and a lower surface 48 that extends forwardly from the inner upright surface 46. An elongate opening 50 is formed in the depression and communicates with the elongate opening 38. A boss 52 extends upwardly from the lower surface 48 of the depression 44 and serves as a pivot point for reciprocal movement of the turntable assembly 32. An arcuate slot or groove 54 is formed in the upper wall 36 adjacent the depression 44, with a radial center of the groove 54 located at a center of the boss 52.

The turntable assembly 32 includes a pivot plate 60 pivotally connected to the support base 30, a turntable 62 rotatably connected to the pivot plate 60, an annular bearing assembly 64 positioned between the pivot plate 60 and the turntable 62, and a control knob 66 mounted to the pivot plate 60 for manually moving the turntable assembly 32 along an arcuate path coincident with the arcuate slot or groove 54 in the upper wall 36.

A first internally threaded boss 70 is preferably formed integral with the pivot plate 60. The boss 70 extends downwardly from the pivot plate 60 at a pivot axis 68 of the pivot plate. The boss 70 is preferably pivotally connected to the boss 52 through a fastener 72 that extends upwardly through the boss 52 and threads into the boss 70. The boss 70 is preferably offset from a central axis 69 of the pivot plate so that rotation of the pivot plate about the boss 70 occurs along an arcuate pathway. A guide projection 74 is formed on the pivot plate 60 and extends downwardly into the arcuate slot 54 of the upper wall 36 to guide and limit the amount of pivotal movement of the pivot plate 60 with respect to the upper wall. Although only one guide projection 74 is shown, it will be understood that a plurality of guide projections can be provided.

A second internally threaded boss 76 is formed integrally with, and extends downwardly from a center of the pivot plate 60. A fastener 82 extends through a raised hub 80 of the turntable 62 and is threaded into the second boss 76 for rotatably coupling the turntable 62 to the pivot plate 60 with the annular bearing assembly 64 sandwiched between the turntable and the pivot plate. A knob mounting portion 78 is also preferably integrally formed with the pivot plate 60. When assembled, the knob mounting portion 78 extends into the opening 50 of the support base 30.

The turntable 62 has an outer circumferentially extending rim 84 that is centered around the raised hub 80. The rim 84 together with the raised hub 80 form an annular channel 86 into which a bottom 88 of the bowl 24 is received. The bottom 88 of the bowl 24 is preferably shaped to fit over the raised hub 80. The turntable 62 also includes a downwardly extending annular rib 90 and an annular depression or raceway 92 formed inwardly of the annular rib 90. The annular bearing assembly 64 is received within the annular raceway 92 and the annular rib 90 serves to hold the bearing assembly against lateral movement.

The annular bearing assembly 64 preferably includes a ring 94 with a plurality of sockets 96 integrally formed in the ring, and a ball bearing 98 mounted in each socket. Preferably, the ring 94 and sockets 96 are integrally formed of a plastic material with sufficient elasticity to permit a press-fit installation of the ball bearings 98 into the sockets. As best shown in FIG. 3, upper and lower portions of the ball bearings project above and below the sockets 96 for contacting the raceway 92 of the turntable 62 and an upper surface of the pivot plate 60, respectively.

The control knob 66 has a mounting portion 100, a knob portion 102, and an arm portion 104 that extends between the mounting portion 100 and the knob portion 102. Preferably, the control knob 66 is integrally formed of a plastic material. The mounting portion 100 of the control knob 66 is connected to the knob mounting portion 78 of the pivot plate 60 through fasteners 106 or the like, such that the arm portion 104 extends through the elongate opening 38 of the support base 30.

Figure 4:
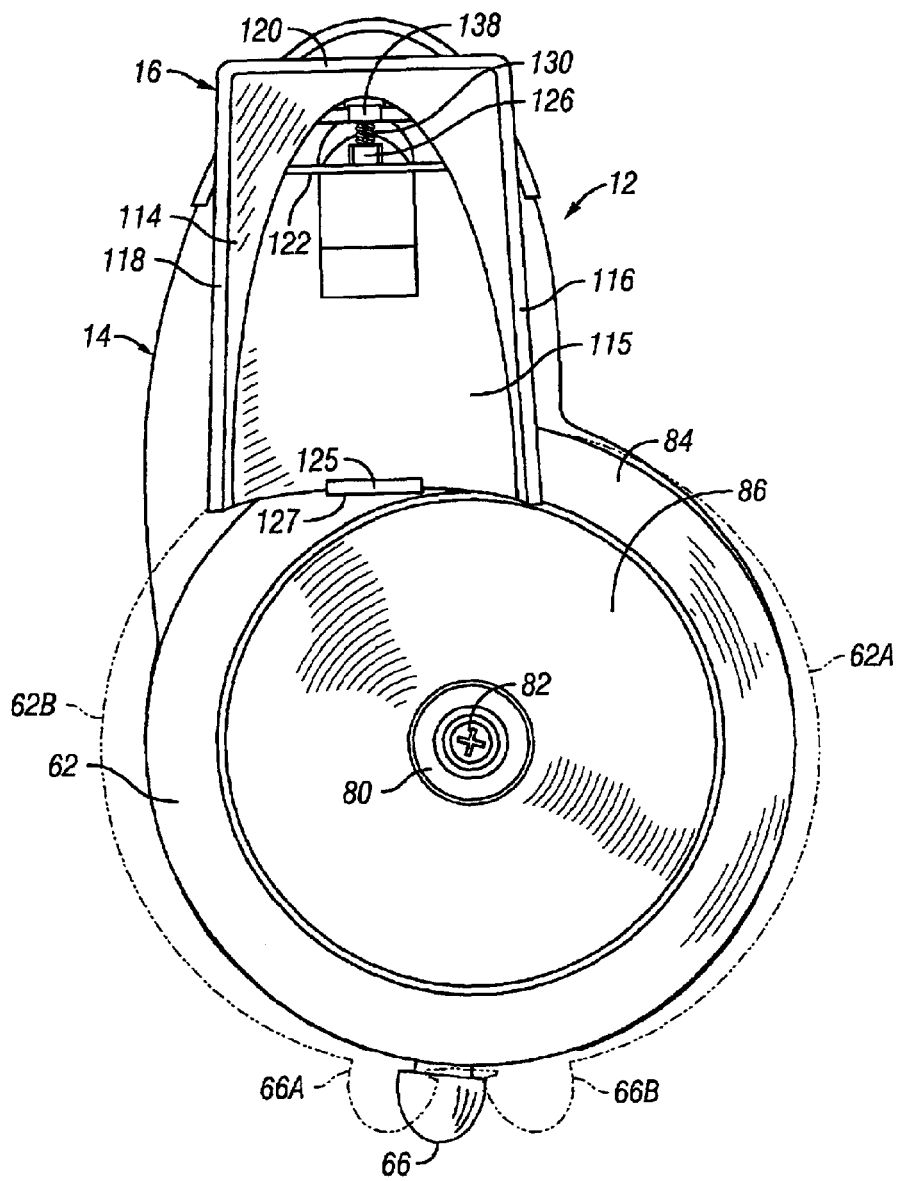
FIG. 4 is a top plan view of the mixer stand.
Figure 5:
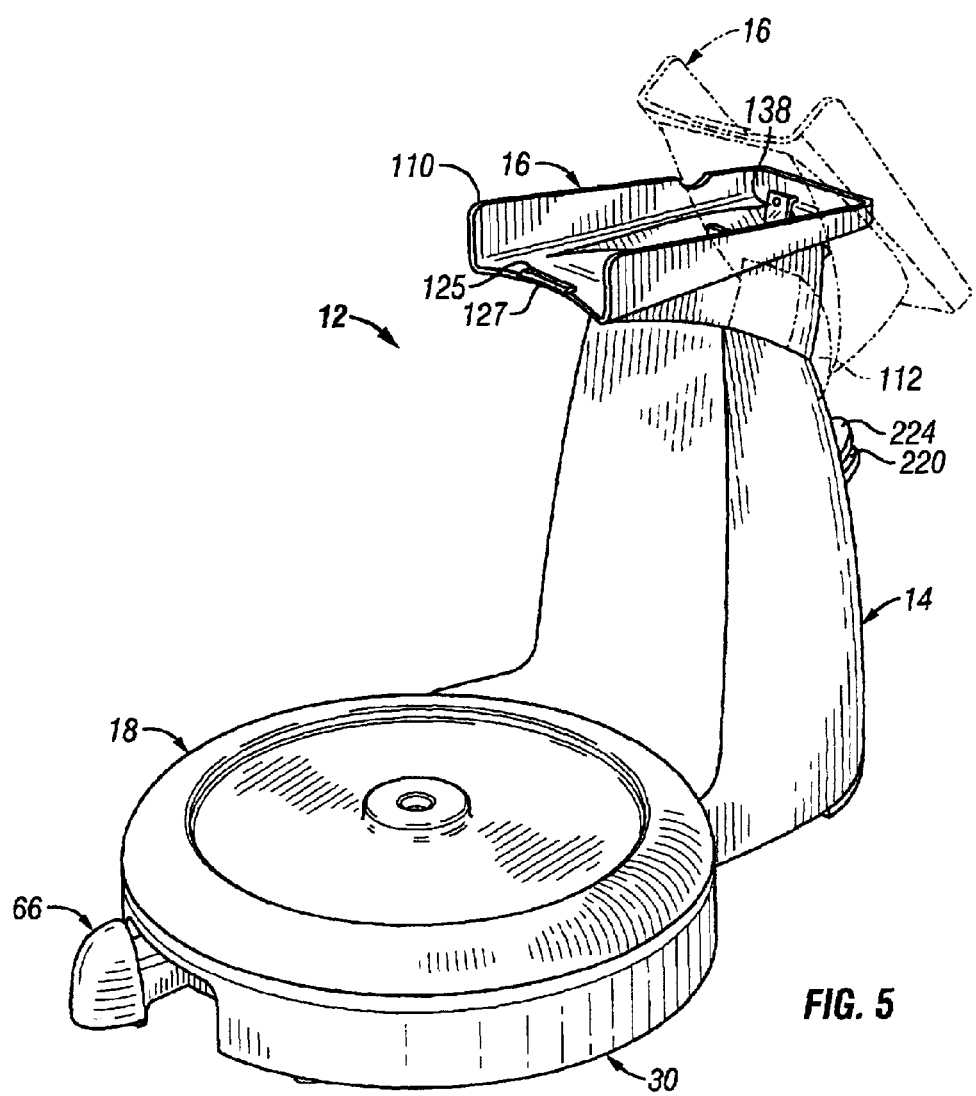
FIG. 5 is a front perspective view of the mixer stand with the pivot head in a tilted position.

As shown in FIG. 4, movement of the control knob 66 in a clockwise direction, as represented by numeral 66A, causes the turntable 62 to pivot toward a far right position as represented by numeral 62A. Likewise, movement of the control knob 66 in a counter-clockwise direction as represented by numeral 66B, causes the turntable 62 to pivot toward a far left position as represented by numeral 62B. In this manner, the turntable is adjustable to allow positioning of the mixing implements at locations between the side and center of the bowl while permitting rotation of the bowl with the turntable during operation of the hand mixer 20.

With reference now to FIGS. 2, 2A, 2B, 3, and 5–7, the pivot head 16 includes a cradle 110 that receives and supports the hand mixer 20 and a support column 112 that extends generally downwardly from the cradle 110.

The cradle 110 has a bottom wall 114 with an intermediate portion 115 that slopes generally downwardly and rearwardly when the pivot head 16 is in the upright position as shown in FIG. 3, a pair of side walls 116, 118 extending generally upwardly from the bottom wall 114, and a rear wall 120 extending between the side walls and generally upwardly from the bottom wall 114. An intermediate support wall 122 also extends between the side walls and is positioned forwardly of the rear wall 120. A mixer locking mechanism 124 is connected to the intermediate support wall 122 for selectively locking and releasing the hand mixer 20 with respect to the cradle 110. A flange 125 is formed on the bottom wall 114 and extends generally forwardly therefrom to form a hook portion 127 for engaging and holding the hand mixer 20 when mounted in the cradle 110.

The mixer locking mechanism 124 has a bracket 126 that is fixed to the intermediate support wall 122, a release button 128 that is slidably received in the bracket 126, and a compression spring 130 that is positioned between the bracket 126 and the release button 128 for biasing the release button 128 rearwardly out of an opening 132 in the rear wall 120. The release button 128 includes a main body 134, a portion of which projects rearwardly of the rear wall 120 for manipulation by a user, a rod 136 that extends generally forwardly from the main body 134, and a latch 138 that extends generally upwardly from the main body 134. The compression spring 130 is mounted on the rod 136 and is compressed between the main body 134 and the intermediate support wall 122. A forward end of the rod 136 extends through an opening 140 in the intermediate support wall 122 so that the rod 136 is free to slide in an axial direction when the main body portion is depressed. The latch 138 has a hook portion or flange 142 that engages and holds the hand mixer 20 in the cradle 110.

Figure 8:
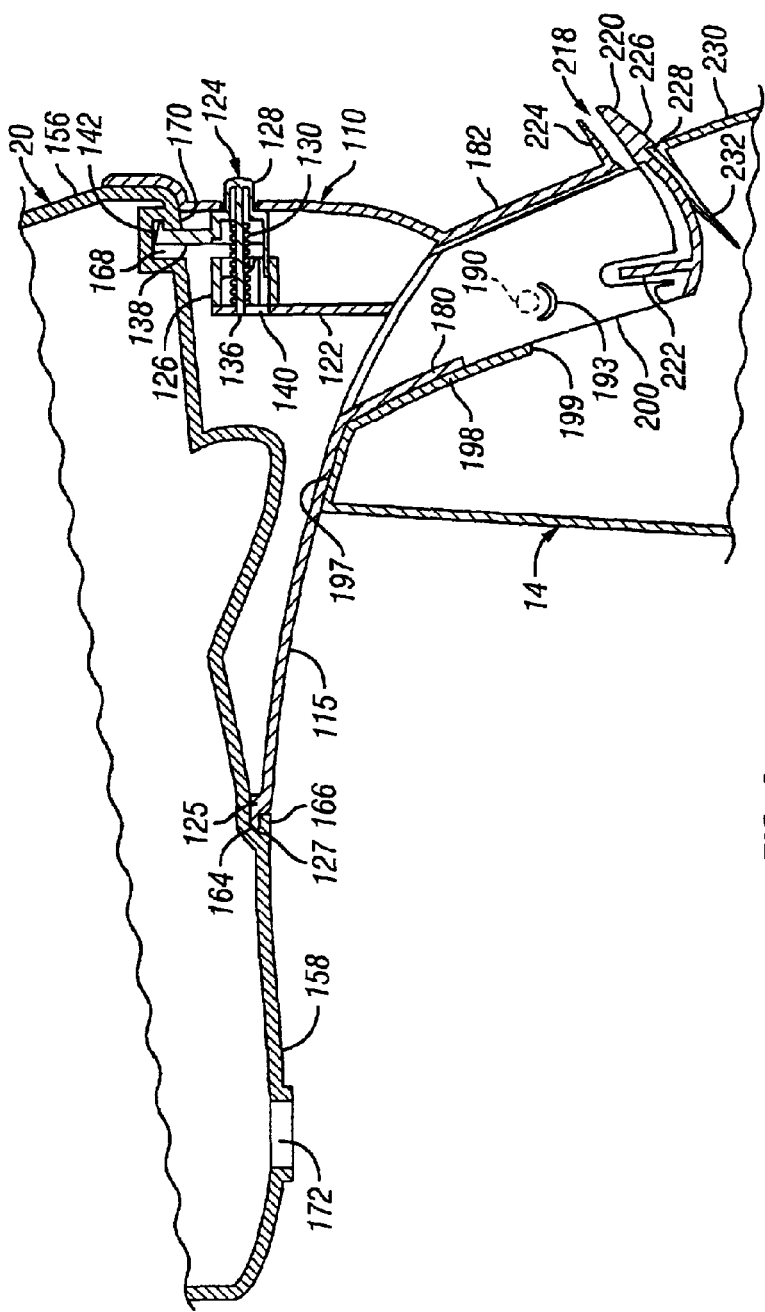
FIG. 8 is an enlarged sectional view of the pivot head with an attached hand mixer shown in outline.
Figure 9:
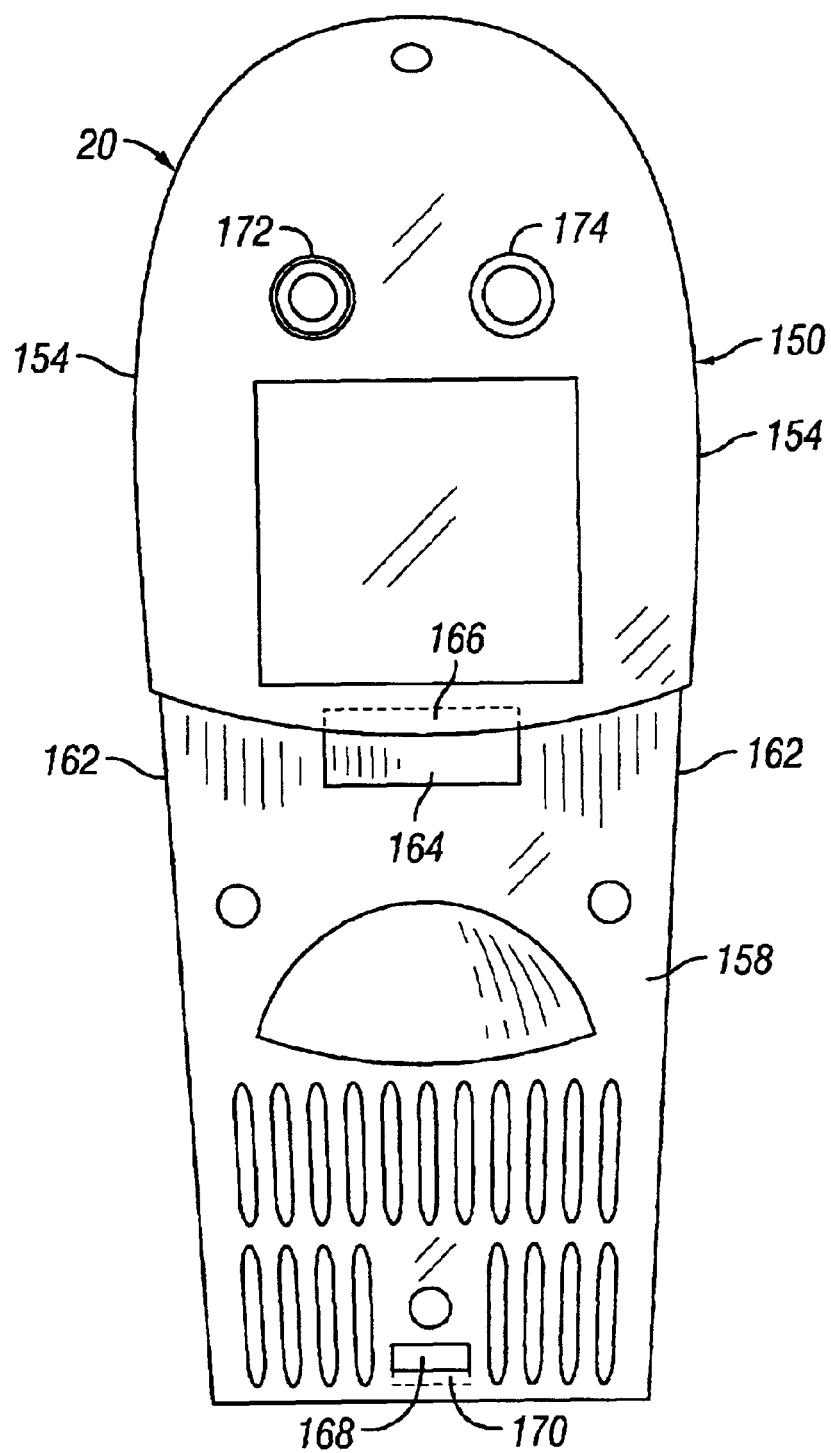
FIG. 9 is a bottom plan view of a mixer head in accordance with the present invention.

Referring to FIGS. 2, 8 and 9, the hand mixer 20 includes a housing 150 that contains an electric motor and transmission assembly (not shown) for operating the implements 22 in a well-known manner. The housing 150 preferably includes side walls 154 that converge at a forward portion of the mixer, a rear wall 156 that extends between the side walls 154, and a bottom wall 158 that extends between the side walls 154 and the rear wall 156. A control panel 152 is preferably provided on an upper portion of the housing 150 adjacent a handle 160 for controlling speed and/or ejection of the implements 22. A depression 162 is preferably formed in each side wall 154 of the hand mixer 20 for receiving the side walls 116 and 118 of the cradle 110 in a flush manner. The bottom wall 158 has a forward depression 164 with a rearwardly extending ledge 166 and a rear depression 168 with a forwardly extending ledge 170. Openings 172, 174 in the bottom wall 158 are sized to receive the shafts of the implements 22 in a well-known manner.

As best shown in FIG. 8, in order to mount the hand mixer 20 on the cradle 110, the forward depression 164 in the bottom wall 158 is aligned with the flange 125 on the bottom wall 114 and moved until the hook portion 127 of the flange 125 engages the ledge 166 from inside the forward depression 164. The hand mixer is then rotated about the flange 125 until the ledge 170 of the rear depression 168 is in contact with the hook portion 142 of the latch 138. Further rotation of the hand mixer 20 will cause the latch 138 and the main body 128 of the release button 124 to move forwardly against bias from the spring 130 until the hook portion 142 of the latch 138 is clear of the ledge 170 of the rear depression 168. Once clear, the latch 138 is forced rearwardly under bias from the spring 130 so that the hook portion 142 is positioned over the ledge 170 to thereby hold and lock the hand mixer 20 in place on the cradle 110. In order to release the hand mixer 20 from the cradle 110, the release button 124 is depressed against bias from the spring 130 until the hook portion 142 clears the ledge 170. The hand mixer can then be rotated about the hook portion 127 of the flange 125 and then lifted generally upwardly to remove the flange 125 from the forward depression 164.

Referring now to FIGS. 2A, 2B, 7 and 8, the support column 112 is preferably integrally formed with the cradle 110 and includes a forward wall 180 extending generally downwardly from the intermediate portion 115 of the bottom wall 114, a rear wall 182 extending generally downwardly from the rear wall 120 of the cradle portion 110, side walls 184, 186 extending between the forward wall 180 and the rear wall 182, and a locking mechanism 188 extending between the side walls 184, 186 and the rear wall 182. A pintle 190 is preferably integrally formed with each side wall 184, 186 and extends outwardly through corresponding apertures 192 (FIG. 6) formed in the channel 15 of the pedestal 14 to pivotally mount the pivot head 16 to the pedestal 14.

Slots 194 (FIG. 6) are formed in side wall portions 195 and 196 of the channel 15. The slots 194 extend from an upper wall 197 of the pedestal 14 to the apertures 192 to provide some measure of clearance for the pintles 190 during installation of the pivot head 16 on the pedestal 14. Preferably, arcuate slots 193 are formed around each pintle 190 to provide some measure of flexure during installation of the pivot head 16 onto the pedestal 14. An inner wall portion 198 of the channel 15 extends between the side wall portions 195 and 196 from the upper wall 197. A lower edge 199 of the inner wall portion 198 is adapted to contact a forward edge 200 of the side walls 184, 186 when the pivot head 16 is in the fully tilted position, as shown in FIG. 7.

Figure 2A:
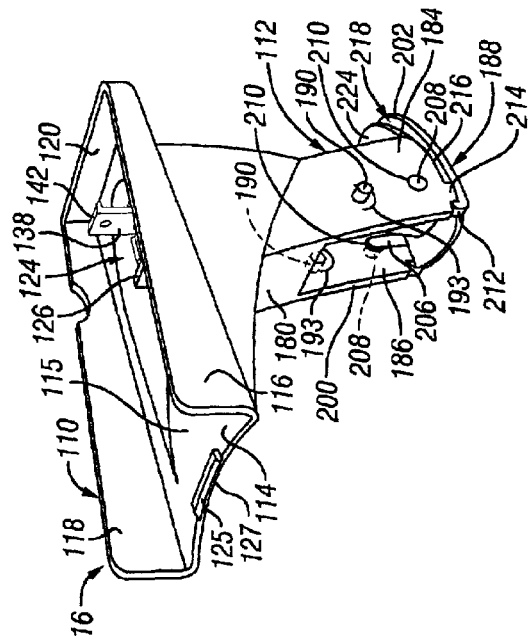
FIG. 2A is an enlarged exploded perspective view of a pivot head that forms part of the mixer assembly of the present invention.
Figure 2B:
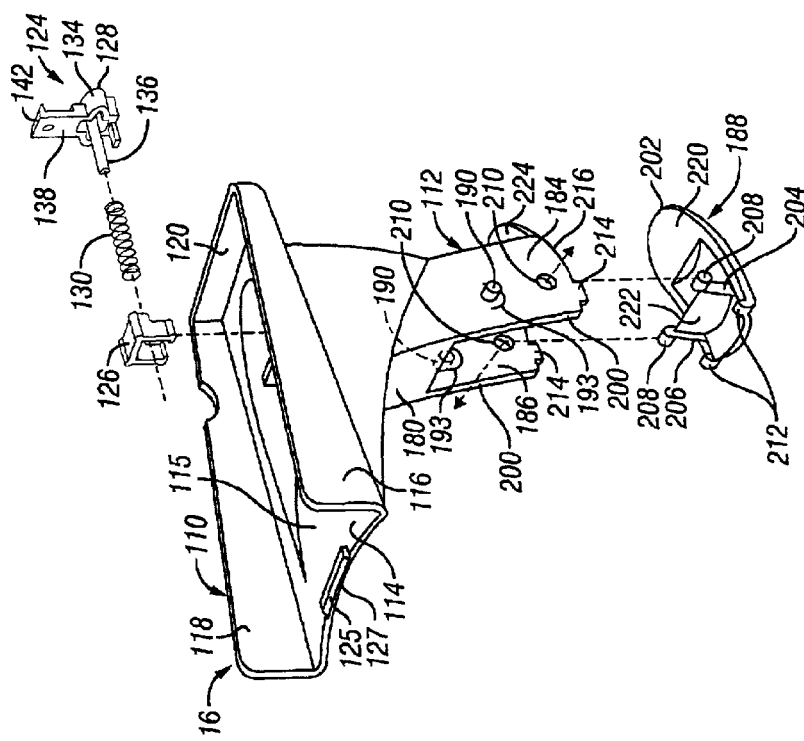
FIG. 2B is an enlarged perspective view of the pivot head in an assembled condition.

With particular reference to FIGS. 2A and 2B, the locking mechanism 188 includes a cantilevered locking member 202 that is arcuate in shape and connection arms 204, 206 that are preferably integrally formed with and project upwardly from a forward or proximal portion of the locking member 202. Each connection arm 204, 206 has a cylindrical protrusion 208 that is received in an aperture 210 formed in each side wall 284, 286 of the support column 112 so that the locking member 202 is mounted to the support column in cantilever fashion. A spacer tab 212 extends upwardly from the locking member 202 and engages a spacer tab 214 that extends downwardly from a lower edge 216 of each side wall 184, 186 to create a gap 218 between the lower edge 216 and the locking member 202. Due to the arrangement of the tabs 212, 214 and the connection arms 204, 206 mounted in their respective apertures 210, a rear or distal locking portion 220 of the locking member 202 functions as a cantilever arm that is elastically biased in a downward or locking position. A web 222 preferably extends between the connection arms 204, 206 from the locking member 202 to strengthen the connection arms against unwanted bending. A support flange 224 is preferably formed at a lower end of the support column 112 and extends rearwardly therefrom. The support flange 224 can be grasped by a user during upward movement of the rear locking portion 220 of the locking member 202 during unlocking of the pivot head to give added leverage.

Figure 7:
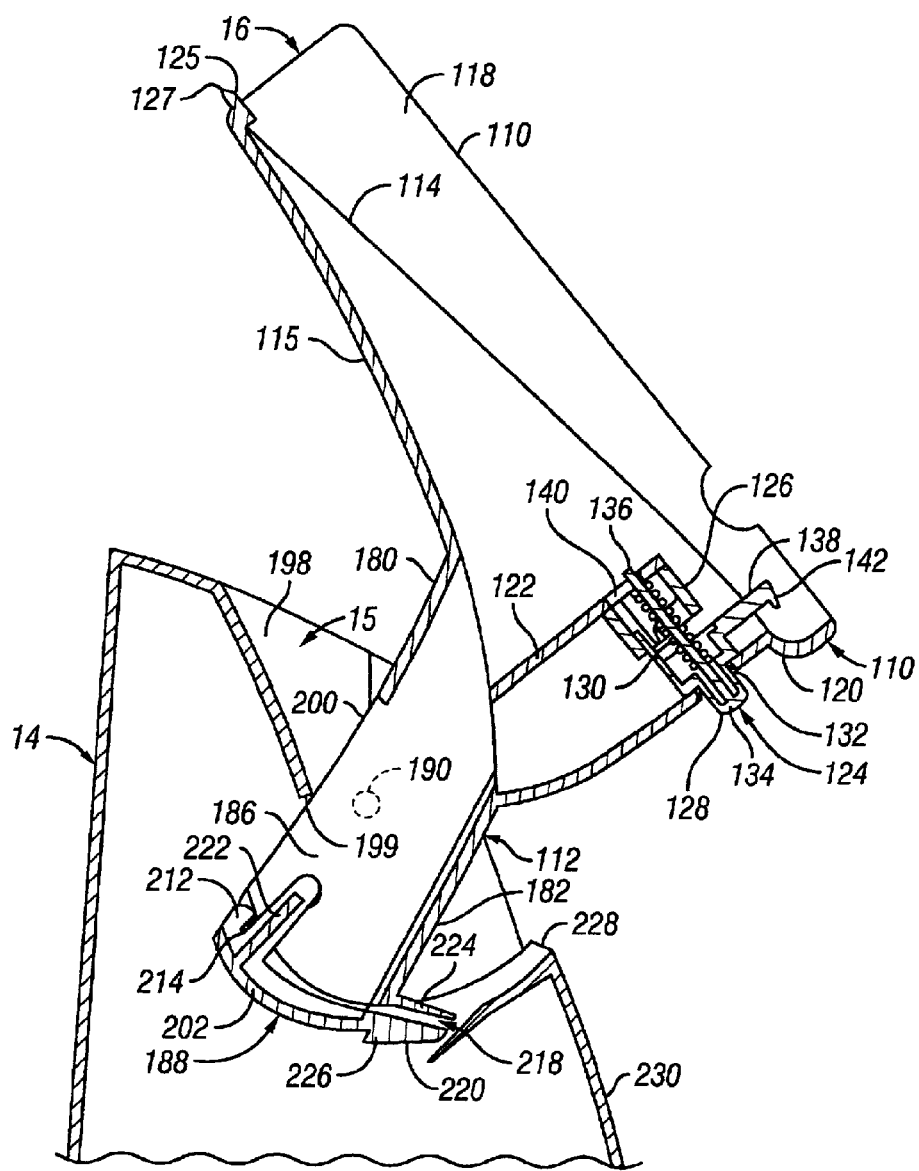
FIG. 7 is an enlarged sectional view of a portion of the mixer stand with the pivot head in the tilted position.

As shown in FIGS. 7 and 8, the rear locking portion 220 of the locking member 202 includes a downwardly projecting step or protrusion 226 that engages an edge 228 formed at the intersection of the channel 15 and a rear wall 230 of the pedestal 14. A curved guide flange 232 extends generally downwardly and forwardly from the edge 228 for guiding movement of the rear locking portion 220 of the locking member 202.

In use, and as shown in FIG. 8, the pivot head 16 is initially in the upright locked position with the step 226 of the locking portion 220 engaging the edge 228 of the pedestal 14 to prevent relative pivotal movement between the pivot head 16 and the pedestal 14 in the clockwise direction as viewed in FIG. 8. In this position, the intermediate portion 115 engages the upper wall 197 and the front wall 180 engages the inner wall portion 198 to prevent relative pivotal movement between the pivot head 15 and the pedestal 14 in the counter-clockwise direction as viewed in FIG. 8.

When it is desirous to tilt the hand mixer 20 rearwardly for removing or inserting implements or gaining direct access to the bowl by a user, the pivot head 16 is unlocked by grasping the locking portion 220 and moving it generally upwardly until the step 226 clears the edge 228. The support flange 224 can be simultaneously grasped for additional leverage. Once the step 226 is clear of the edge 228, the pivot head 16 and attached hand mixer 20 can be rotated in a clockwise direction as viewed in FIG. 7 until the forward edges 200 of the side walls 184, 186 contact the lower edge 199 of the inner wall portion 198. During clockwise rotation of the pivot head 16, the locking member 202 engages the guide flange 232 under elastic bias to both guide the locking member 202 and impart a measure of frictional resistance against pivoting movement of the pivot head 16.

When it is desirous to tilt the hand mixer 20 forwardly to the upright position, the pivot head is rotated in a counter clockwise direction as viewed in FIG. 7 until the step 226 snaps over the edge 228.

Although a particular arrangement has been shown for biasing the locking member 202 toward the locking position, it will be understood that the locking member can be biased toward the locking position through a pivot connection between the locking member and the column and one or more strategically located springs. Alternatively, the locking member can be integrally formed with the column to include a built-in bias toward the locking position.

Figure 10:
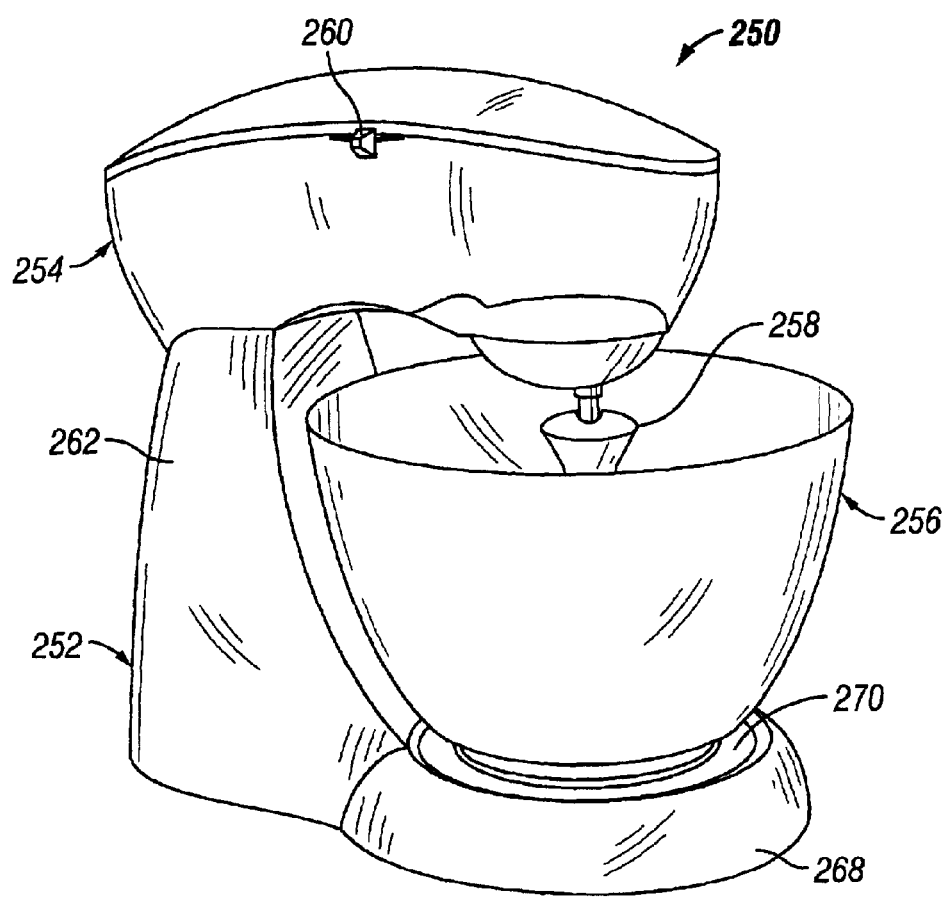
FIG. 10 is a perspective view of a mixer assembly in accordance with a second embodiment of the invention.
Figure 11:
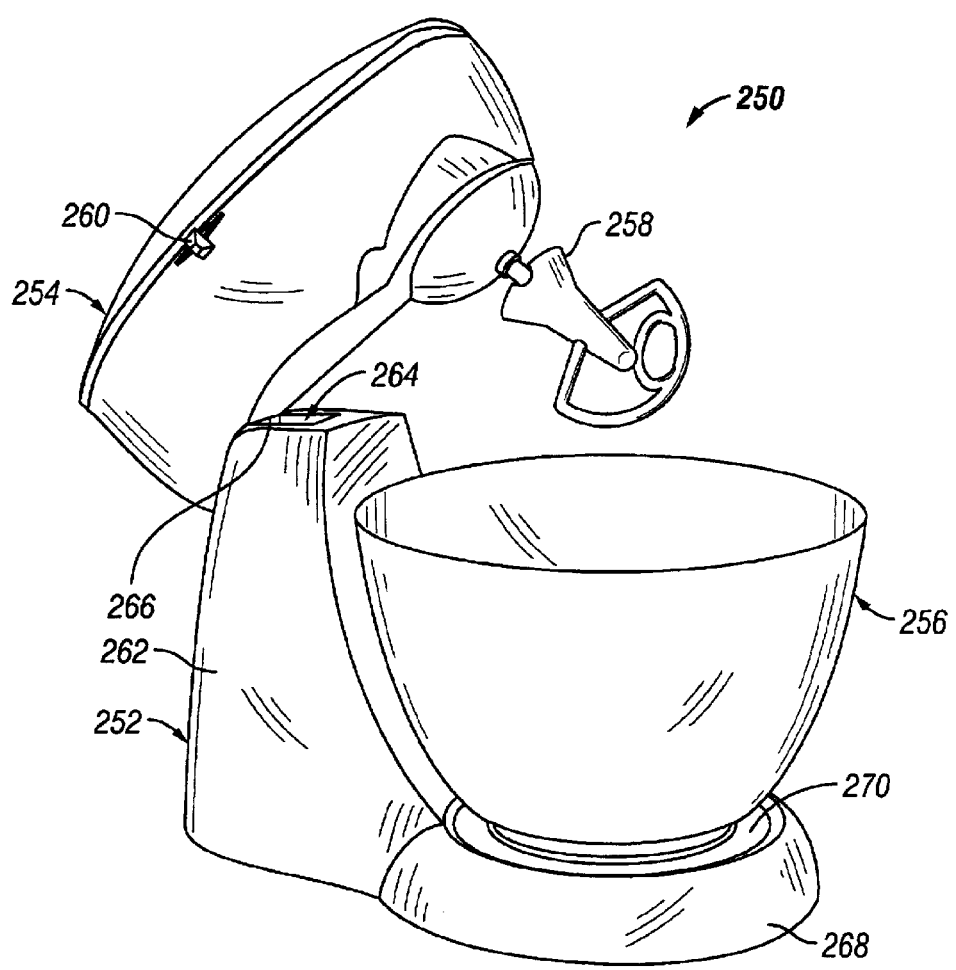
FIG. 11 is a perspective view of the mixer assembly second embodiment in a tilted position.

With reference now to FIGS. 10 and 11, a mixer assembly 250 in accordance with a further embodiment of the invention is illustrated. The mixer assembly 250 includes a mixer stand 252, a pivot head 254 connected to the mixer stand 252, and a mixing bowl 256 supported on the mixer stand. The pivot head 254 preferably houses an electric motor and suitable gearing (not shown) for driving a detachable mixing implement, such as a paddle 258. A combination on/off speed selection switch 260 interfaces with the electric motor and an electrical power source (not shown) for controlling operation of the mixer assembly 250.

As in the previous embodiment, the mixer stand 252 has a pedestal 262 with a channel 264 (FIG. 11), a support column 266 extending downwardly into the channel 264 from the pivot head 254, and a platform portion 268 extending from the pedestal 262. A lower end of the support column 266 is preferably pivotally connected to the pedestal 262 through a pivot shaft or the like (not shown) that extends through the support column. The platform portion 268 includes a support surface 270 that is adapted to receive and hold the mixing bowl 256. The support surface 270 may be rotatable and/or adjustable as in the previous embodiment, or may be stationary.

Figure 12:
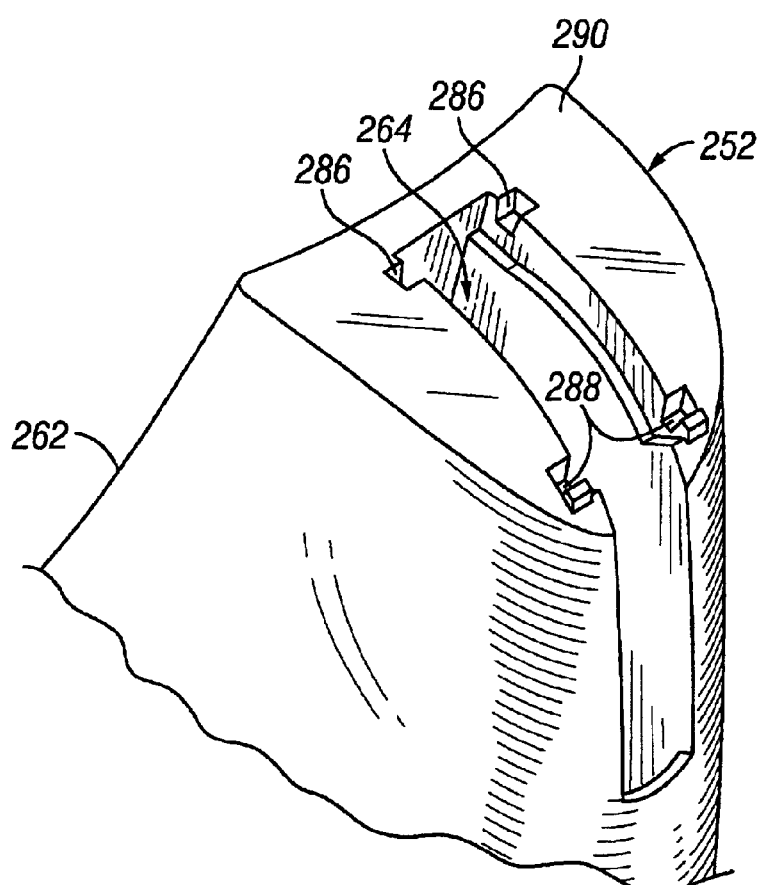
FIG. 12 is a rear perspective view of an upper portion of a mixer stand that forms part of the mixer assembly second embodiment.
Figure 13:
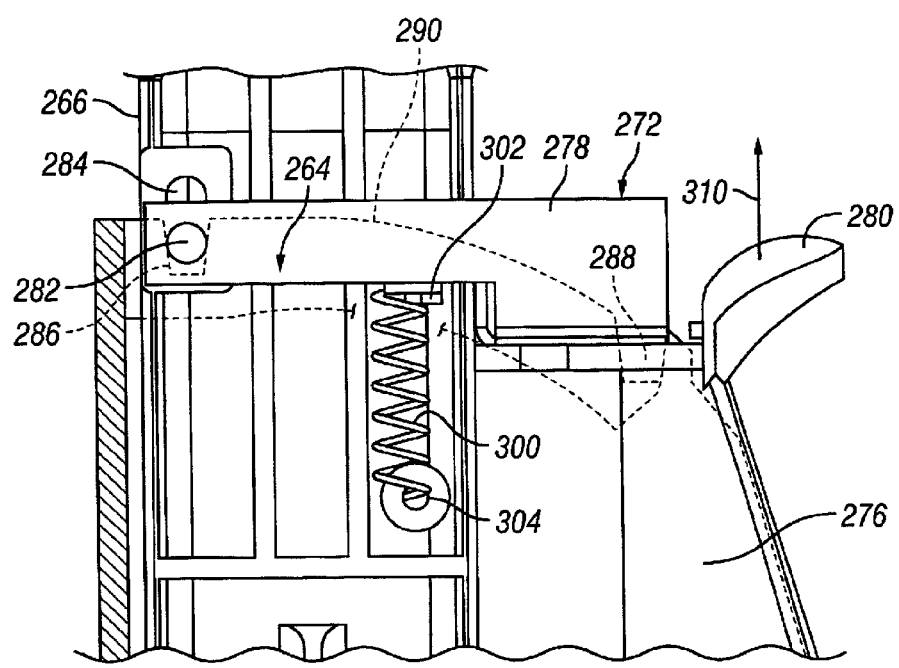
FIG. 13 is a sectional view of a tilting mechanism that forms part of the mixer assembly second embodiment, with the tilting mechanism in an upright locked position.

With additional reference to FIGS. 12 and 13, a locking mechanism 272 is mounted on the support column 266 for limited sliding movement along a length of the support column. The locking mechanism 272 includes a main body portion 276 that fits within the channel 264 when the pivot head 254 is in the upright position, an actuator lever 278 that extends generally forwardly from the main body portion 276, and an actuator button 280 that extends generally rearwardly from the main body portion 276. A locking rod or element 282 preferably extends from opposite sides of the actuator lever 278 near a forward end thereof. One end of the locking rod 282 also preferably extends through an elongate slot 284 formed in the support column 266 for limiting movement of the locking mechanism 272 with respect to the support column. The locking rod 282 has opposite ends that are normally positioned in either a forward pair of grooves 286 (FIG. 12) or a rearward pair of grooves 288 formed in an upper wall 290 of the pedestal 262 on opposite sides of the channel 264. When the pivot head 254 and the support column 266 are in the upright position as viewed in FIG. 10, the opposite ends of the locking rod 282 are positioned in the forward pair of grooves 286. Likewise, when the pivot head 254 and the support column 266 are in the tilted position as viewed in FIG. 10, the opposite ends of the locking rod 282 are positioned in the rearward pair of grooves 288. The locking mechanism 272 further includes a tension spring 300 that extends between a tab 302 formed on the actuator lever 278 and an opening 304 formed in the support column 266 below the actuator lever 278 to bias the locking mechanism 272 generally downwardly toward a retracted or locked position such that the opposite ends of the locking rod 282 snap into one of the forward and rearward pairs of grooves when mutually aligned. It will be understood that other means for biasing the locking mechanism 272 toward the retracted position can alternatively be used, such as compression springs, elastomeric materials, weights, and so on.

Figure 14:
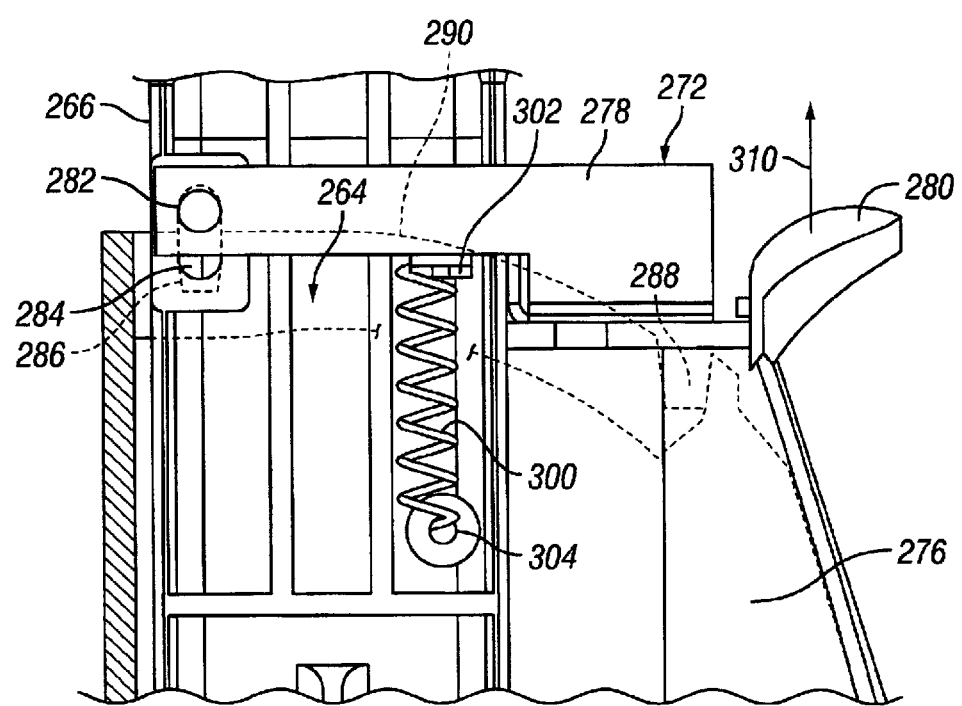
FIG. 14 is a sectional view of the tilting mechanism in an upright unlocked position.
Figure 15:
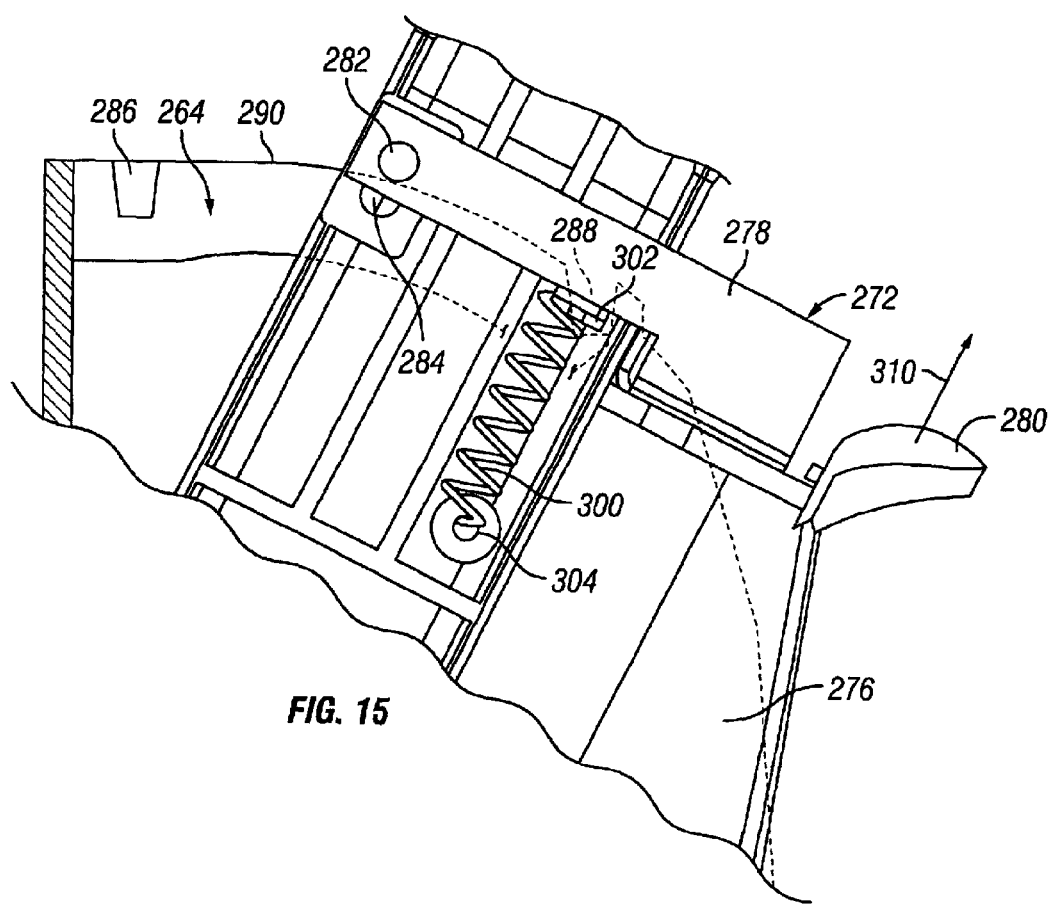
FIG. 15 is a sectional view of the tilting mechanism in a partially tilted position.
Figure 16:
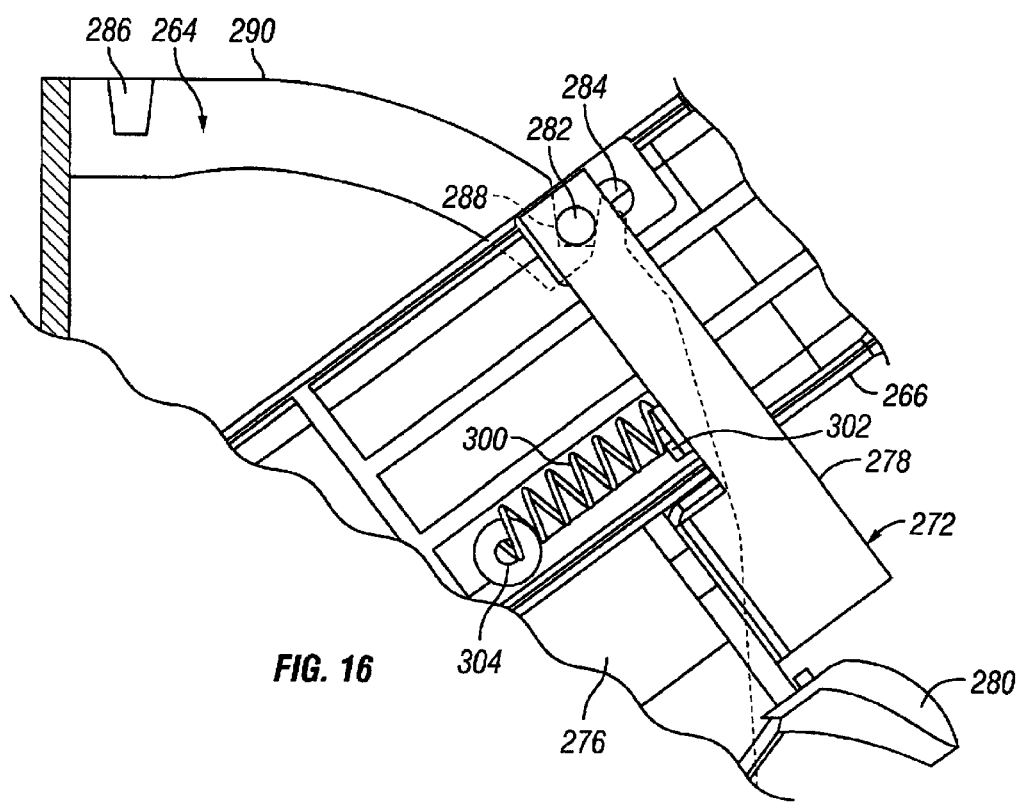
FIG. 16 is a sectional view of the tilting mechanism in a fully tilted and locked position.

In use, and with reference now to FIGS. 13–16, in order to move the pivot head 254 from the upright position (FIG. 10) to the tilted position (FIG. 11), the actuator button 280 of the locking mechanism 272 is moved upwardly against bias from the spring 300, as represented by arrow 310 in FIG. 13, until the opposite ends of the locking rod 282 clear the forward grooves 286 in the pedestal 262, as shown in FIG. 14. The slot 284 in the support column 266 prevents excessive upward movement of the locking mechanism 272. Once the locking rod 282 is clear of the forward grooves 286, the pivot head 254 can be tilted in a clockwise direction as viewed in FIG. 15. If the actuator button 280 is released at this point, the locking rod 282 will ride along the upper wall 290 on opposite sides of the channel 264 until it reaches the rear grooves 288, upon which the locking rod 282 will snap into the rear grooves 288 under force from the spring 300. In this manner, the pivot head 254 can be easily released and locked in either the upright or tilted position. In order to move the pivot head from the tilted position to the upright position, the opposite procedure is followed. It will be understood that other grooves can be provided in the upper wall 290 between the forward and rearward grooves for multiple tilt positions of the pivot head with respect to the support column 266.

It is contemplated that the tilt and locking assembly of the second embodiment can be used with the first embodiment comprising the removable hand mixer. Likewise, it is contemplated that the tilt and locking assembly of the first embodiment can be used with the second embodiment comprising the non-removable mixer head.

It will be understood that terms of orientation and/or position as may be used herein, such as upward, downward, inner, outer, front, rear, side, and so on, as well as their respective derivatives and equivalent terms refer to relative, rather than absolute, orientations and/or positions.

It will be appreciated by those skilled in the art that changes could be made to the embodiments described above without departing from the broad inventive concept thereof. It will be understood, therefore, that this invention is not limited to the particular embodiments disclosed, but it is intended to cover modifications within the spirit and scope of the present invention as defined by the appended claims.

We claim:

1. A mixer stand for an electric mixer, the mixer stand comprising:
   a pedestal;
   a pivot head connected to the pedestal for pivotal movement between an upright position for operating the electric mixer and a tilt position;
   a mixer locking mechanism for releasably mounting a hand mixer to the pivot head; and
   a locking mechanism for releasably locking the pivot head with respect to the pedestal in at least one of the upright and tilt positions, the locking mechanism comprising a first locking member operatively connected to the pedestal and a second locking member operatively connected to the pivot head, one of the first and second locking members being biased toward a lower locking position wherein the first and second locking members are mutually engaged to thereby prevent pivotal movement of the pivot head with respect to the pedestal, the one locking member being movable toward an upper release position wherein the first and second locking members are disengaged to thereby permit pivotal movement of the pivot head with respect to the pedestal.

2. A mixer stand according to claim 1, wherein the pivot head comprises a support column that is pivotally connected to the pedestal, and further wherein the first locking member is connected to the support column.

3. A mixer stand according to claim 2, wherein the first locking member comprises an actuator lever slidably connected to the support column, the actuator lever having a forward portion with a locking element extending laterally therefrom for engaging the second locking member in the lower locking position, and an actuator button operatively connected to the actuator lever;

wherein upward movement of the actuator button causes disengagement of the locking element with the second locking member.

4. A mixer stand according to claim 3, and further comprising a biasing member extending between the actuator lever and the support column for biasing the actuator lever toward the lower locking position.

5. A mixer stand according to claim 3, wherein the second locking member comprises at least one forward groove formed in the pedestal for receiving the locking element when the pivot head is in the upright position to thereby lock the pivot head in the upright position.

6. A mixer stand according to claim 5, wherein the second locking member further comprises at least one rearward groove formed in the pedestal for receiving the at least one locking element when the pivot head is in the tilted position to thereby lock the pivot head in the tilted position.

7. A mixer stand according to claim 3, wherein the second locking member comprises at least one rearward groove formed in the pedestal for receiving the locking element when the pivot head is in the tilted position to thereby lock the pivot head in the tilted position.

8. A mixer stand according to claim 3, wherein the support column comprises a slot through which the locking element extends to thereby limit upward movement of the actuator lever.

9. A mixer stand according to claim 3, wherein the pedestal comprises an upper wall and a channel extending into the pedestal from the upper wall, and further wherein the support column extends into the channel.

10. A mixer stand according to claim 9, wherein the locking element comprises a rod with opposite ends, and further wherein the second locking member comprises a pair of forward grooves formed in the upper wall on opposite sides of the channel for receiving the opposite ends of the rod when the pivot head is in the upright position to thereby lock the pivot head in the upright position.

11. A mixer stand according to claim 10, wherein the second locking member further comprises a pair of rearward grooves formed in the upper wall on opposite sides of the channel for receiving the opposite ends of the rod when the pivot head is in the tilted position to thereby lock the pivot head in the tilted position.

12. A mixer stand according to claim 2, wherein the first locking member comprises a cantilever arm having a forward portion connected to the support column and a free rear portion engaging the second locking member in the lower locking position.

13. A mixer stand according to claim 12, wherein the pedestal comprises a rear wall and a channel extending into the pedestal from the rear wall, and further wherein the support column extends into the channel.

14. A mixer stand according to claim 13, wherein the second locking member comprises an edge formed at an intersection of the pedestal rear wall and the channel.

15. A mixer stand according to claim 14, wherein the free rear portion comprises a locking protrusion that engages the edge in the lower locking position so that pivotal movement of the pivot head from the upright position to the tilt position is prevented.

16. A mixer stand according to claim 15, wherein the locking protrusion disengages from the edge upon upward movement of the rear free portion toward the upper release position to thereby permit pivotal movement of the pivot head with respect to the pedestal.

17. A mixer stand according to claim 16, and further comprising a support flange located on the support column adjacent the rear free portion to thereby facilitate manipulation of the rear free portion.

18. A mixer stand according to claim 16, and further comprising a guide flange extending generally downwardly and forwardly from the edge to thereby guide the rear free portion during movement of the pivot head.

19. A mixer stand according to claim 16, wherein the first locking member further comprises a pair of spaced connection arms that extend generally upwardly from the cantilever arm, each connection arm including a protrusion that extends through an aperture formed in opposite sides of the support column to thereby connect the first locking member to the support column.

20. A mixer stand according to claim 19, wherein the first locking member further comprises a first pair of spacer tabs that extend generally upwardly from the cantilever arm and a second pair of corresponding spacer tabs that extend generally downwardly from the support column and engage the first pair of spacer tabs to thereby create a space between the cantilever arm and the support column into which the cantilever arm can flex during upward movement of the rear free portion.

21. A mixer stand according to claim 1, wherein the pivot head comprises a cradle for receiving the electric mixer.

22. A mixer stand according to claim 21, wherein the cradle comprises said mixer locking mechanism with a latch member adapted for releasably engaging the electric mixer to thereby releasably secure the electric mixer to the cradle.

23. A mixer stand according to claim 22 further comprising:
an electric mixer bottom wall with a first depression for receiving the latch member.

24. A mixer stand according to claim 23, wherein the mixer locking mechanism further comprises a flange member located on the cradle at a position spaced from the latch member, and further wherein the bottom wall of the electric mixer comprises a second depression spaced from the first depression for engaging the flange member.

25. A mixer stand according to claim 24, wherein the mixer locking mechanism further comprises:
a release button slidably connected to the cradle with a portion of the release button normally protruding outwardly of the cradle for access by a user, the latch member being connected to the release button for movement therewith; and
a biasing member extending between the cradle and the release button for biasing the latch member toward a locked position.

26. A mixer stand according to claim 25, wherein the mixer locking mechanism further comprises:
a first ledge coincident with the first depression;
a second ledge coincident with the second depression;
a first hook portion on the latch member for engaging the first ledge; and
a second hook portion on the flange member for engaging the second ledge.

27. A mixer assembly comprising:
a hand mixer having a bottom wall;
a base member;
a turntable mounted for rotation on the base member;
a bowl supported on the turntable;
a pedestal extending generally upwardly from the base member;
a cradle connected to an upper portion of the pedestal for receiving the hand mixer; and
a first locking mechanism operably associated with the cradle and the hand mixer for releasably mounting the hand mixer to the cradle, the first locking mechanism comprising a latch member positioned on the cradle and a first depression located on the bottom wall of the hand mixer, the latch member being releasably engageable with the depression to thereby releasably connect the hand mixer to the cradle, a flange member located on the cradle at a position spaced from the latch member, the bottom wall of the hand mixer including a second depression spaced from the first depression for engaging the flange member.

28. A mixer assembly according to claim 27, wherein the first locking mechanism further comprises:
a release button slidably connected to the cradle with a portion of the release button normally protruding outwardly of the cradle for access by a user, the latch member being connected to the release button for movement therewith; and
a biasing member extending between the cradle and the release button for biasing the latch member toward a locked position.

29. A mixer assembly according to claim 28, wherein the first locking mechanism further comprises:
a first ledge coincident with the first depression;
a second ledge coincident with the second depression;
a first hook portion on the latch member for engaging the first ledge; and
a second hook portion on the flange member for engaging the second ledge.

30. A mixer assembly according to claim 27, wherein the cradle is pivotally connected to the pedestal for pivotal movement between an upright position for operating the hand mixer and a tilt position.

31. A mixer assembly according to claim 30, and further comprising a second locking mechanism for releasably locking the cradle with respect to the pedestal in at least one of the upright and tilt positions, the second locking mechanism comprising a first locking member operatively connected to the pedestal and a second locking member operatively connected to the cradle, one of the first and second locking members being biased toward a lower locking position wherein the first and second locking members are mutually engaged to thereby prevent pivotal movement of the cradle with respect to the pedestal, the one locking member being movable toward an upper release position wherein the first and second locking members are disengaged to thereby permit pivotal movement of the cradle with respect to the pedestal.

32. A mixer assembly according to claim 31, and further comprising a support column extending generally downwardly from the cradle, the support column being pivotally connected to the pedestal with the first locking member connected to the support column.

33. A mixer assembly according to claim 32, wherein the first locking member comprises a cantilever arm having a forward portion connected to the support column and a free rear portion engaging the second locking member in the lower locking position.

34. A mixer assembly according to claim 33, wherein the pedestal comprises a rear wall and a channel extending into the pedestal from the rear wall, and further wherein the support column extends into the channel.

35. A mixer assembly according to claim 34, wherein the second locking member comprises an edge formed at an intersection of the pedestal rear wall and the channel.

36. A mixer assembly according to claim 35, wherein the free rear portion comprises a locking protrusion that engages the edge in the lower locking position so that pivotal movement of the cradle from the upright position to the tilt position is prevented.

37. A mixer assembly according to claim 36, wherein the locking protrusion disengages from the edge upon upward movement of the rear free portion toward the upper release position to thereby permit pivotal movement of the cradle with respect to the pedestal.

38. A mixer assembly according to claim 37, and further comprising a support flange located on the support column adjacent the rear free portion to thereby facilitate manipulation of the rear free portion.

39. A mixer assembly according to claim 37, and further comprising a guide flange extending generally downwardly and forwardly from the edge to thereby guide the rear free portion during movement of the pivot head.

40. A mixer assembly according to claim 37, wherein the first locking member further comprises a pair of spaced connection arms that extend generally upwardly from the cantilever arm, each connection arm including a protrusion that extends through an aperture formed in opposite sides of the support column to thereby connect the first locking member to the support column.

41. A mixer assembly according to claim 40, wherein the first locking member further comprises a first pair of spacer tabs that extend generally upwardly from the cantilever arm and a second pair of corresponding spacer tabs that extend generally downwardly from the support column and engage the first pair of spacer tabs to thereby create a space between the cantilever arm and the support column into which the cantilever arm can flex during upward movement of the rear free portion.

* * * * *